US011665329B2

(12) United States Patent
Ecker et al.

(10) Patent No.: US 11,665,329 B2
(45) Date of Patent: May 30, 2023

(54) OPTICAL PASSIVE STEREO ASSEMBLY

(71) Applicant: Inuitive Ltd., Raanana (IL)

(72) Inventors: Ady Ecker, Ness Ziona (IL); Mishel Ivgi, Yehud-Monoson (IL)

(73) Assignee: INUITIVE LTD., Ra'anana (IL)

(*) Notice: Subject to any disclaimer, the term of this patent is extended or adjusted under 35 U.S.C. 154(b) by 0 days.

(21) Appl. No.: 17/513,325

(22) Filed: Oct. 28, 2021

(65) Prior Publication Data
US 2023/0133982 A1 May 4, 2023

(51) Int. Cl.
H04N 13/239 (2018.01)
H04N 13/106 (2018.01)
H04N 13/271 (2018.01)
H04N 13/246 (2018.01)
G06T 3/60 (2006.01)
G06T 7/80 (2017.01)
G06T 7/593 (2017.01)

(52) U.S. Cl.
CPC .......... H04N 13/239 (2018.05); G06T 3/60 (2013.01); G06T 7/593 (2017.01); G06T 7/85 (2017.01); H04N 13/106 (2018.05); H04N 13/246 (2018.05); H04N 13/271 (2018.05); G06T 2200/04 (2013.01); G06T 2207/10012 (2013.01); G06T 2207/30244 (2013.01)

(58) Field of Classification Search
None
See application file for complete search history.

(56) References Cited

U.S. PATENT DOCUMENTS

| 2007/0103460 | A1* | 5/2007 | Zhang | G06T 7/285 |
| | | | | 345/419 |
| 2014/0016857 | A1* | 1/2014 | Richards | G06T 7/55 |
| | | | | 382/154 |
| 2016/0241841 | A1* | 8/2016 | Dorot | H04N 13/239 |
| 2022/0262115 | A1* | 8/2022 | Zhang | G06V 10/751 |

* cited by examiner

Primary Examiner — Samuel D Fereja
(74) Attorney, Agent, or Firm — Browdy and Neimark, PLLC

(57) ABSTRACT

An optical passive stereo assembly for generating a three-dimensional image, the optical assembly comprising: two image capturing devices each mounted within the optical passive stereo assembly in a skewed position to the other with respect to the horizontal plane; a processor configured to: process data retrieved from a plurality of pixels comprised within images captured by the two image capturing devices, and generate a point cloud, being a set of data points in a 3D space retrieved from the tilted coordinate system (X', Y', Z'); apply a 2D rotation in the X-Y plane to the point cloud, thereby converting the coordinate system of the resulting point cloud to a conventional cartesian coordinate system (X, Y, Z), to enable generating the three-dimensional image.

10 Claims, 2 Drawing Sheets

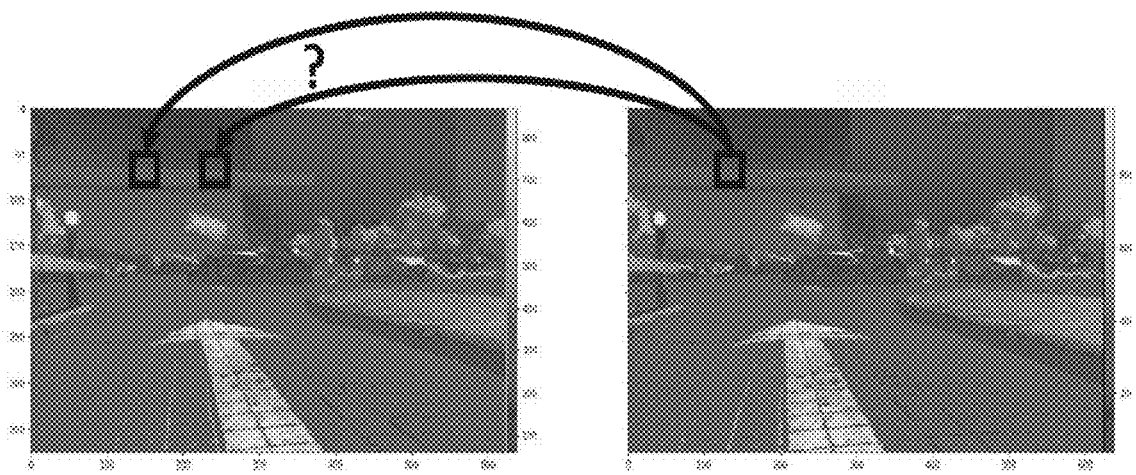
FIG. 1A  FIG. 1B
FIG. 2A  FIG. 2C
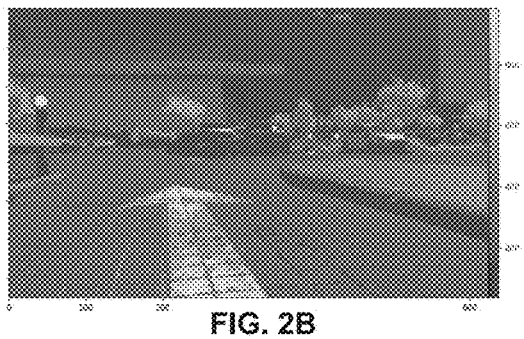 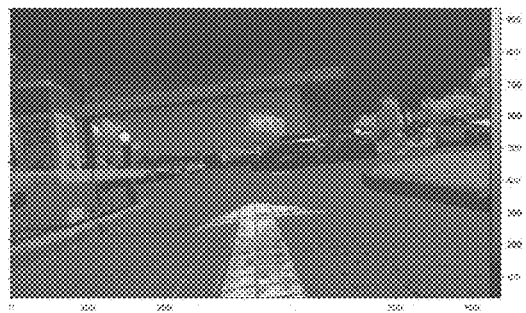
FIG. 2B  FIG. 2D
 

OPTICAL PASSIVE STEREO ASSEMBLY

TECHNICAL FIELD

The present disclosure generally relates to optical devices, and more particularly, to an improved optical passive stereo assembly.

BACKGROUND

A stereoscopic camera arrangement is an element that comprises two camera units, assembled in a stereoscopic module. Stereoscopy (also referred to as "stereoscopics") is a technique for determining the depth in an image by means of stereopsis. In other words, it is the impression of depth that is perceived when a scene is viewed with both eyes by someone with normal binocular vision which is responsible for creating two slightly different images of the scene in the two eyes due to the eyes'/camera's different locations.

Passive stereo systems are based on image point matching (e.g., image block matching) along epipolar lines. An epipolar line is the straight line of intersection of the epipolar plane with the image plane. It is the image in one camera of a ray traversing from the optical center of the other camera to a 3D point at the scene being captured. In the case of rectified images, the epipolar lines are the rows of the images.

Yet, repeating structures along the epipolar lines can cause wrong matches, or correct matches having low confidence, as other matches with similar matching scores are possible. FIGS. 1A and 1B illustrate an example of the ambiguity experienced in matching stereo images' blocks along horizontal edges, using a prior art apparatus. FIG. 1A is an image derived from the left camera and FIG. 1B is an image derived from the right camera.

For the sake of simplicity, it is assumed in the following discussion that the images are rectified images, although the problem which the present invention seeks to solve depends on the direction vector that extends between the centers of projection of the two stereo cameras, and does not depend on the image projection. For instance, in unrectified fisheye cameras the block matching will occur along curved epipolar lines, and could be ambiguous if the direction vector between the centers of the two cameras and the 3D edge of the observed object are co-planar.

Unfortunately, the frequency of horizontal edges' occurrences in images, is relatively high. This phenomenon is caused by the distribution of 3D edges' orientations and the distribution of camera orientations.

The distribution of 3D edges' orientations is a non-uniform distribution, especially when the images are captured in man-made environments and urban scenes. Edges parallel to the ground are commonly encountered as floor or road markings, e.g., a pedestrian crossing, or as horizontal surfaces, e.g., furniture such as desks and shelves.

Moreover, although most images are taken while using cameras that are positioned parallel to the ground, camera's orientations are not uniform. A common way to capture an image using cameras known in the art, is the head-on approach by which the image capturing device is positioned so that straight objects comprised in the scene whose image is about to be captured, appear horizontal in the captured image. For example, let us consider a car driving along a certain lane, which approaches a stop line that is painted on the road. This line will appear horizontal in a camera mounted on the car that looks parallel to the road.

The present invention proposes a solution for the provisioning of an improved passive stereo system module which reduces the occurrences of horizontal edges, yet providing the user with the experience of a regular depth camera.

SUMMARY OF THE DISCLOSURE

The disclosure may be summarized by referring to the appended claims.

It is an object of the present disclosure to provide an improved optical passive stereo assembly, and a method of using same.

It is another object of the present disclosure to provide an optical passive stereo assembly that reduces the occurrence frequency of horizontal edges while providing the user with an experience of using a horizontal, regular depth stereo assembly.

Other objects of the present invention will become apparent from the following description.

According to a first embodiment of the disclosure, there is provided an optical passive stereo assembly for generating a three-dimensional image, the optical passive stereo assembly comprising:

at least two image capturing devices for capturing at least two stereoscopic images, wherein each of the at least two image capturing devices are mounted internally within the optical passive stereo assembly in a skewed position to the other with respect to the horizontal plane; and at least one processor configured to:

process data retrieved from a plurality of pixels comprised within images captured by the at least two image capturing devices, and generate a point cloud, being a set of three-dimensional data points in a space retrieved from the tilted coordinate system (X', Y', Z');

apply a 2D rotation in the X-Y plane to the 3D point cloud, thereby converting the coordinate system of the resulting 3D point cloud retrieved from the tilted coordinate system (X', Y', Z) to a conventional cartesian coordinate system (X, Y, Z) to enable generating said three-dimensional image.

The term "horizontal plane" as used herein throughout the specification and claims, is used to denote the plane in the world which is identified with the plane that is parallel to the ground plane.

According to another embodiment of the present invention, the at least one processor is configured to apply the 2D rotation in the X-Y plane to the point cloud, based on a tilt angle determined in a process of calibrating the optical passive stereo assembly.

In accordance with another embodiment of the present invention, the at least one processor is further configured to back-project the point cloud onto a virtual straight image grid, to resample said virtual straight image grid and to obtain interpolated depth estimate at the virtual straight image grid.

By yet another embodiment the at least one processor is configured to determine horizontal orientation of the optical passive stereo assembly by determining the direction of the gravitational force.

According to still another embodiment, the optical passive stereo assembly further comprising at least two openings (e.g., at least two windows), each located at the frontal face of said optical passive stereo assembly and in front of a respective image capturing device, wherein the at least two openings appear from outside of the optical passive stereo assembly to be parallel to at least one side line of the assembly's external envelop, while overlapping each a respective image capturing device from among the at least two image capturing devices that are mounted in a skewed position with respect to each other.

According to another aspect of the present disclosure there is provided a method for generating a three-dimensional image by using an optical passive stereo assembly which comprises at least two image capturing devices for capturing at least two stereoscopic images, wherein each of the at least two image capturing devices are mounted internally within the optical passive stereo assembly in a skewed position to the other with respect to the horizontal plane, the method comprises the steps of:

retrieving data from a plurality of pixels comprised within images captured by the at least two tilted image capturing devices;

generating a point cloud, being a set of data points in a 3D space retrieved from the tilted coordinate system (X', Y', Z);

applying a 2D rotation in the X-Y plane to the point cloud, thereby converting the coordinate system of the resulting point cloud retrieved from the tilted coordinate system (X', Y', Z) to a conventional cartesian coordinate system (X, Y, Z); and generating the three-dimensional image.

According to yet another embodiment of this aspect, the method further comprising a step of calibration of the optical passive stereo assembly for determining a tilt angle for use in the step of applying the 2D rotation in the X-Y plane to the point cloud.

By still another embodiment, the method further comprising a step of back-projecting the point cloud onto a virtual straight image grid, and resampling the virtual straight image grid to obtain interpolated depth estimate at the virtual straight image grid.

In accordance with another embodiment, the method further comprises a step of determining horizontal orientation of the optical passive stereo assembly by determining the direction of the gravitational force.

BRIEF DESCRIPTION OF THE DRAWINGS

For a more complete understanding of the present invention, reference is now made to the following detailed description taken in conjunction with the accompanying drawing wherein:

FIGS. 1A and 1B—illustrate an example of ambiguity in matching stereo images along horizontal edges which using a prior art apparatus, where FIG. 1A is an image derived from the left camera and FIG. 1B is an image derived from the right camera;

FIGS. 2A to 2D—FIG. 2A shows an image captured by using a horizontal optical stereo assembly; FIG. 2B is the horizontal disparity; FIG. 2C depicts an image captured by using a tilted optical stereo assembly; and FIG. 2D is the rotated disparity;

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

The issue addressed by the present disclosure is the provisioning of an improved passive stereo system module. The present solution aims to reduce the occurrence frequency of horizontal edges while still providing the user with the experience of a regular depth camera.

In order to decrease the occurrence horizontal edges comprised in an image, the present solution proposes the use of a tilted stereo assembly. This solution enables lowering in average the number of occurrences of horizontal edges in a tilted stereo assembly, which in turn improves the performance of the tilted stereo assembly, as may be seen for example in FIG. 2A to 2D. FIG. 2A shows an image captured by using a horizontal optical stereo assembly; FIG. 2B is the horizontal disparity; FIG. 2C depicts an image captured by using a tilted optical stereo assembly; and FIG. 2D is the rotated disparity. The parts of the barrier disappear when carrying out the reconstruction based on using the horizontal (straight) camera.

However, the solution provided by the present invention is one that combines implementation of a tilted stereo assembly on one hand while still providing the user with the experience of using a regular straight depth camera so that for the user is practically unaware of the fact that image capturing elements comprised within the assembly are tilted, and instead the experience is of using a stereo assembly (e.g., a regular straight depth camera) that is used when positioned horizontally.

In order to achieve the above, the solution provided herewith suggests to have the stereo assembly that is internally tilted, but one which appears externally straight (parallel to the ground) like a regular depth camera. As depicted for example in FIG. 3 which illustrates a schematic view of the optical passive stereo assembly 300 construed according to an embodiment of the present invention.

Figure 3:
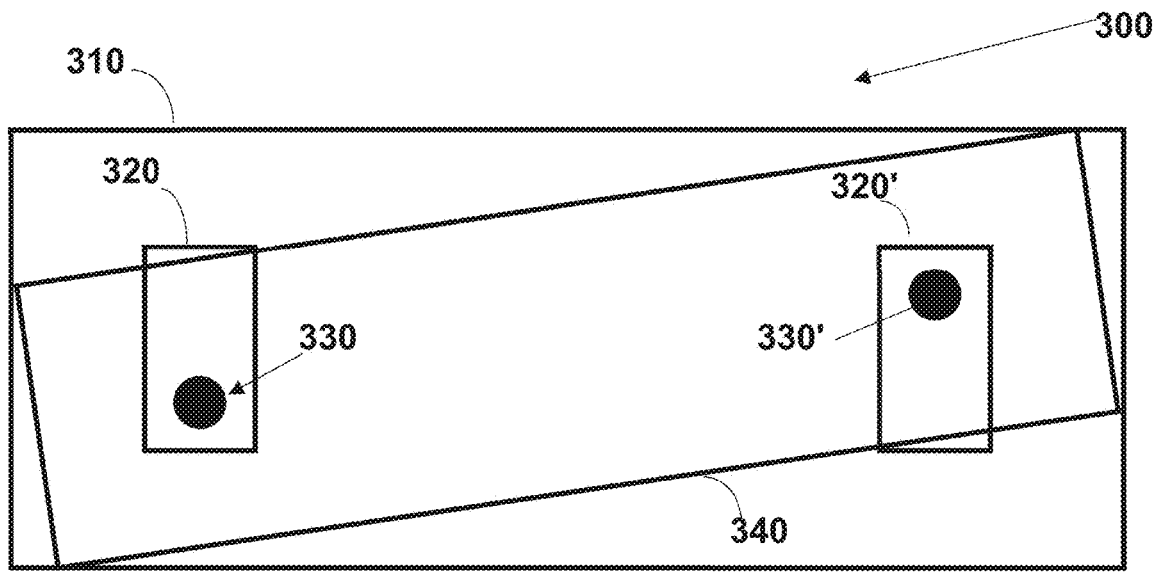
FIG. 3—illustrates a schematic view of the optical passive stereo assembly construed in accordance with an embodiment of the present invention.

As may be seen from FIG. 3, optical passive stereo assembly 300 comprises an external envelope 310 which has two windows, 320 and 320', through which the two cameras 330 and 330' capture images. It should be noted that when capturing an image, the two windows of the present invention's optical passive stereo assembly exemplified in this FIG. 3, appear from the outside to be parallel to the external envelop of the assembly, although these two windows cover a tilted pair of cameras. Optical passive stereo assembly 300 further comprises an inner module 340 includes the two cameras 330 and 330' that are mounted each in a skewed position to the other, with respect to the horizontal plane.

Figure 4:
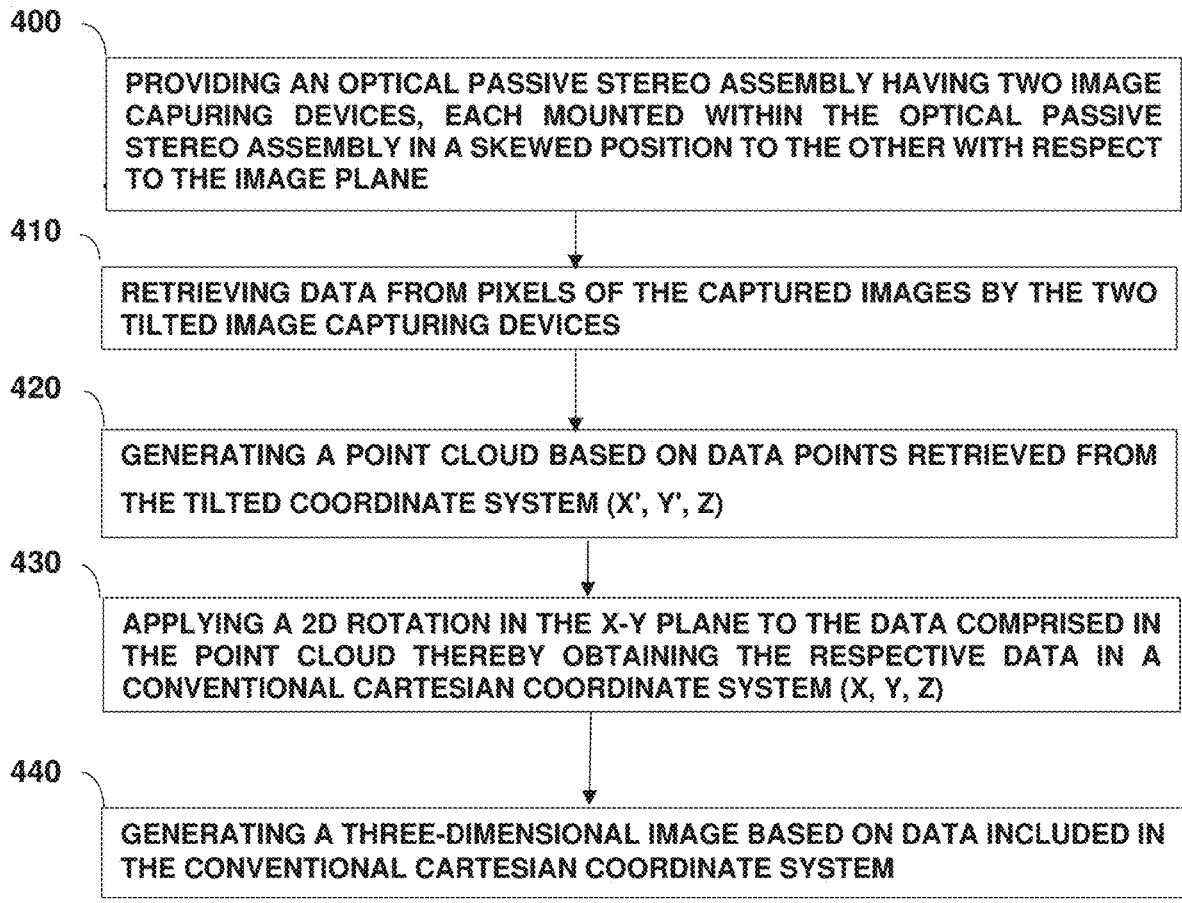
FIG. 4—exemplifies an embodiment of a method for carrying out the present invention.

FIG. 4 exemplifies a method construed in accordance with an embodiment of the present invention.

First, an optical passive stereo assembly is provided (step 400) which comprises two image capturing images (e.g., camera modules), each mounted within the optical passive stereo assembly in a skewed position to the other with respect to the horizontal plane.

Next, data is retrieved from pixels comprised in the images captured by the two tilted image capturing devices (step 410).

The retrieved data is then used to generate a point cloud (step 420), which is a set of data points in space. The points represent a 3D shape, where each point position has its set of Cartesian coordinates ($X_i$, $Y_i$, and $Z_i$). Generally, point clouds are generated by measuring many points on the external surfaces of objects.

Next, the coordinate system of the resulting point cloud retrieved from the tilted coordinate system (X',Y',Z) is converted to a straight coordinate system (X,Y,Z) by applying a 2D rotation in the X-Y plane. The angle of this rotation can be found for example from a CAD design or by carrying out a calibration process (step 430).

Finally, a 3D image is generated (step 440) based on data included in the conventional cartesian coordinate system.

In another embodiment, in case where a straight depth map is desired, it is possible to back-project the point cloud on a virtual straight image grid, and resample the grid in order to obtain interpolated estimate for the depth at the grid points of that virtual camera.

By yet another embodiment, the stereo assembly that is internally tilted is adapted to be mounted on a robotic arm, and by implementing a software application that controls the robotic arm, the latter is capable of dynamically maintaining the tilt angle relatively to the horizontal direction, thereby obtaining the desired result of the present solution.

Optionally, the determination of the horizontal orientation (at which the internally tilted stereo assembly should be positioned) is made by determining the direction of the gravitational force, g, which may be retrieved by using for example an inertial measurement unit ("IMU") or a gyroscope-based device.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. An optical passive stereo assembly for generating a three-dimensional image, the optical assembly comprising:
    at least one pair of image capturing devices for capturing at least two stereoscopic images, wherein each of said at least one pair of image capturing devices are mounted within said optical passive stereo assembly in a tilted position at a tilt angle, wherein the tilt angle is pre-determined with respect to a horizontal plane; and
    at least one processor configured to:
        process data retrieved from a plurality of pixels comprised within images captured by said at least one pair of image capturing devices, and generate a point cloud, being a set of data points in a 3D space retrieved from the processed data retrieved from the plurality of pixels comprised within the images captured in the tilted coordinate system (X', Y', Z), which is tilted at the pre-determined tilt angle with respect to the horizontal plane;
        apply a 2D rotation in the X-Y plane to the point cloud, thereby converting the coordinate system of the resulting point cloud retrieved from the tilted coordinate system (X', Y', Z) to a conventional cartesian coordinate system (X, Y, Z) parallel to the horizontal plane to enable generating said three-dimensional image.

2. The optical passive stereo assembly of claim 1, wherein said at least one processor is configured to apply the 2D rotation in the X-Y plane to the point cloud, based on a tilt angle determined in a calibration process.

3. The optical passive stereo assembly of claim 1, wherein said at least one processor is further configured to back-project said point cloud onto a virtual straight image grid, to resample said virtual straight image grid and to obtain interpolated depth estimate at the virtual straight image grid.

4. The optical passive stereo assembly of claim 1, wherein said at least one processor is configured to determine horizontal orientation of the optical passive stereo assembly by determining the direction of the gravitational force.

5. The optical passive stereo assembly of claim 1, further comprising at least two openings, each located at the frontal face of said optical passive stereo assembly and in front of a respective image capturing device, wherein said at least two openings appear from outside of said optical passive stereo assembly to be parallel to at least one side line of said assembly external envelop, while overlapping each a respective image capturing device from among said at least one pair of image capturing devices.

6. The optical passive stereo assembly of claim 1 with its at least one pair of image capturing devices mounted in their tilted position, wherein said optical passive stereo assembly appears externally parallel to the ground, as if the optical passive stereo assembly were a regular depth camera.

7. A method for generating a three-dimensional image by using an optical passive stereo assembly which comprises at least one pair of image capturing devices for capturing at least two stereoscopic images, wherein each of said at least one pair of image capturing devices are mounted within said optical assembly in a tilted position at a tilt angle, wherein the tilt angle is pre-determined with respect to a horizontal plane, said method comprises the steps of:
    retrieving data from a plurality of pixels comprised within images captured by said at least one pair of tilted image capturing devices;
    generating a point cloud, being a set of data points in a 3D space retrieved from the processed data retrieved from the plurality of pixels comprised within the images captured in the tilted coordinate system (X', Y', Z)), which is tilted at the pre-determined tilt angle with respect to the horizontal plane;
    applying a 2D rotation in the X-Y plane to the point cloud, thereby converting the coordinate system of the resulting point cloud retrieved from the tilted coordinate system (X', Y', Z) to a conventional cartesian coordinate system (X, Y, Z) parallel to the horizontal plane; and
    generating said three-dimensional image.

8. The method of claim 7, wherein the method further comprising a step of calibration for determining a tilt angle for use in the step of applying the 2D rotation in the X-Y plane to the point cloud.

9. The method of claim 7, further comprising a step of back-projecting said point cloud onto a virtual straight image grid, and resampling said virtual straight image grid to obtain interpolated depth estimate at the virtual straight image grid.

10. The method of claim 7, further comprising a step of determining horizontal orientation of the optical passive stereo assembly by determining the direction of the gravitational force.

* * * * *